3,231,325
EVAPORATION SUPPRESSION
Thomas H. Oster, 156 S. Franklin, Dearborn, Mich.
No Drawing. Filed June 20, 1963, Ser. No. 289,411
3 Claims. (Cl. 21—60.5)

This invention relates to a process for the suppression of evaporation of water from lakes, ponds and reservoirs during times when such bodies of water are exposed daily to large doses of solar radiation. These large daily doses of solar radiation cause a sharp thermal stratification of the body of water with a highly heated layer of water immediately at the surface. This heated surface layer exhibits a concomitant high vapor tension which vastly increases the rate of evaporation. A cursory inspection of the curve of water vapor tension plotted against temperature will disclose a very sharp increase in vapor tension in the range between sixty and one hundred degrees Fahrenheit which is the range of temperatures normally encountered in water body surface layers.

A large amount of work has been expended in the last decade in the suppression of water evaporation by floating upon the body of water a thin, insoluble and hydrophobic monolayer of chemicals designed to decrease the effective vapor tension of the surface layer. The most successful of these evaporation suppressants are the long chain fatty alcohols having from eighteen to twenty carbon atoms in the chain. This work is well known and will not be further described other than to refer to a scholarly article by La Mer appearing in Chemical Engineering, June 10, 1963, page 213 et seq.

I have discovered that the application of this type of monolayer evaporation suppressant is to a large extent self defeating, especially under conditions of intense solar radiation. A body of water is an almost perfect black body and the solar radiation so absorbed tends to strongly heat the very surface layers. It is from the surface layers that evaporation must take place. This increase in temperature of the surface layers sharply increases the differential between the vapor tension of the water and that of the water vapor in the supernatant air. An increase in the rate of evaporation is unavoidable.

Under normal conditions the temperature of the surface layers of such bodies of water is kept down by the latent heat of evaporation of water. This large factor which amounts to almost one thousand B.t.u.'s per pound of evaporation tends to lower the surface temperature despite large solar radiation loads. However, the application of surface layer evaporation suppressants by their very action of suppressing evaporation tends to raise the temperature of the surface layers and so again raise the rate of evaporation. An equilibrium evaporation rate is attained which is lower than that which would obtain in the absence of the suppressant, but higher than that which would normally be predicted.

Most natural bodies of water have a large thermal reservoir of cooler water available just under the warmer surface layers. This reserve of cooler water is not naturally available to inhibit the surface tension of the water layer just under the suppressant surface layer because of the tendency of water to stratify sharply thermally under these conditions. This natural thermal stratification under the suppressant layer can be modified and the rate of evaporation sharply reduced by a gentle mechanical circulation of the cooler lower layers to the surface of the body of water. Devices for the accomplishment of this circulation are taught by:

Gross, 3,083,538, April 2, 1963.
Oster, 2,991,622, July 11, 1961.

The operation of this invention is dependent upon the fact that the vapor tension of water increases exponentially with increasing temperature in the range of temperatures normally found in water surfaces exposed to strong solar radiation. The circulation of water from the cooler subsurface layers to the surface of the body of water retards evaporation sharply. This circulation is most necessary when the pond is exposed to strong solar radiation. At other times the circulation may be interrupted to permit the stored solar energy to be dissipated from the surface by radiation as differentiated from the usual evaporative cooling. Thus at night and on cool or very cloudy days the circulation should be interrupted so that natural water stratification can bring the warmest water to the surface to permit such warmth to be radiated away. By this means the unavoidable accumulation of solar energy can be dissipated by radiation and both undesirable evaporation and unduly high surface temperatures can be avoided.

I claim as my invention:

1. A process for the suppression of evaporation from the surface of bodies of water which are exposed to solar radiation comprising coating the surface of the water body with a thin layer of water insoluble hydrophobic evaporation inhibitor and dissipating the heat generated by solar radiation by causing a circulation of water between the surface layers and cooler lower layers.

2. A process for the suppression of evaporation from the surface of bodies of water which are exposed to solar radiation comprising coating the surface of the water body with a thin layer of a water insoluble hydrophobic evaporation inhibitor and dissipating the heat generated by solar radiation by causing a circulation of water between the surface layers and the cooler lower layers only while exposed to such solar radiation.

3. A process for the suppression of evaporation from the surface of bodies of water which are exposed to solar radiation comprising coating the surface of the water body with a thin layer of a water insoluble hydrophobic evaporation inhibitor whereby a tendency to extreme thermal stratification is established and decreasing such thermal stratification by circulating cooler subsurface waters to the surface.

References Cited by the Examiner

UNITED STATES PATENTS 3,109,288  10/1963  Gross _____ 61—1

OTHER REFERENCES

Boon et al.: and Grundy are available as abstracts in American Water Works Association Journal, vol. 50, March 1958, P. & R., page 70.

Boon et al.: "Observation on the Use of Hexadecyl Alcohol for Conservation of Water," J. Inst. Water Engrs. (Br.), vol. 11, page 443, 1957.

Grundy: "The Use of Hexadecyl Alcohol to Reduce Reservoir Evaporation," J. Inst. Water Engrs. (Br.), vol. 11, page 429, 1957.

MORRIS O. WOLK, *Primary Examiner.*